July 7, 1931.  J. I. PARRISH  1,813,420
INDICATOR
Filed Jan. 18, 1930  2 Sheets-Sheet 1
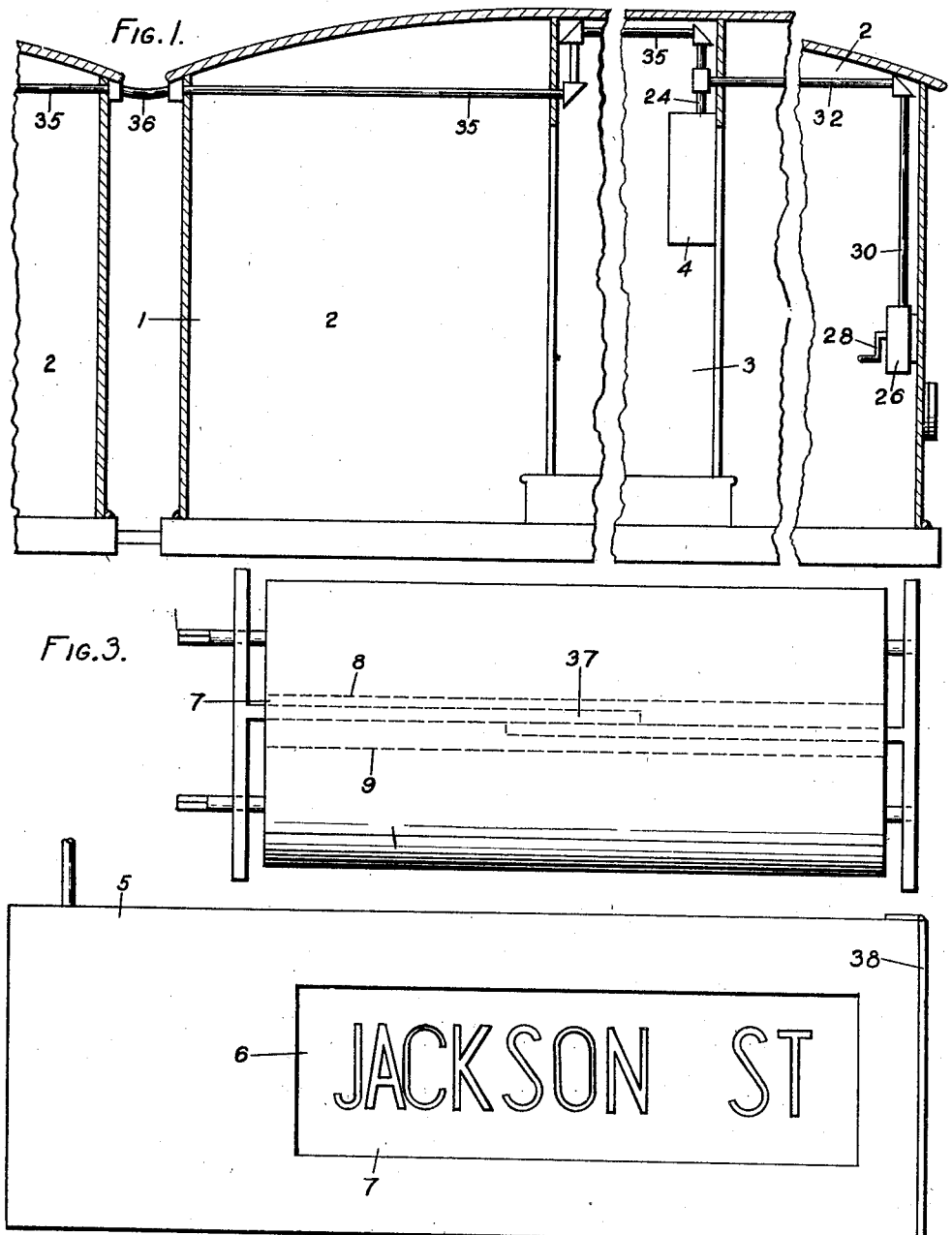

July 7, 1931.   J. I. PARRISH   1,813,420
INDICATOR
Filed Jan. 18, 1930   2 Sheets-Sheet 2

Inventor
JAMES I PARRISH
By Owen H. Spencer
Attorney

Patented July 7, 1931

1,813,420

UNITED STATES PATENT OFFICE

JAMES I. PARRISH, OF INDIANAPOLIS, INDIANA

INDICATOR

Application filed January 18, 1930. Serial No. 421,842.

This invention relates to indicators, especially designed for use in connection with street railway cars, interurban trains, busses and the like and one feature of the invention is the provision of a belt having the names of approaching streets, stations or the like thereon, together with a pair of reels upon which the belt may be wound from either direction.

A further feature of the invention is the provision of means for manually driving said reels.

A further feature of the invention is the provision of a housing having a compartment at one portion thereof for the reception of the driving means and another portion for the reception of the belt supporting reels and belt thereon.

A further feature of the invention is the provision of means for removably securing the reels in driving relation with the driving means therefor.

A further feature of the invention is the provision of means for locking the reels within the housing therefor.

A further feature of the invention is the provision of means for operating one or a plurality of the displaying devices from a master operating device.

Other objects and advantages will be hereinafter more fully set forth and pointed out in the accompanying specification.

In the accompanying drawings which are made a part of this application,

Figure 1 is a fragmentary sectional view, with parts broken out, of a pair of coaches showing the manner of applying the indicator.

Figure 2 is a front elevation of a housing in which the indicating mechanism is mounted.

Figure 3 is a front elevation of the reel carrying frame and the belt mounted thereon.

Figure 4:
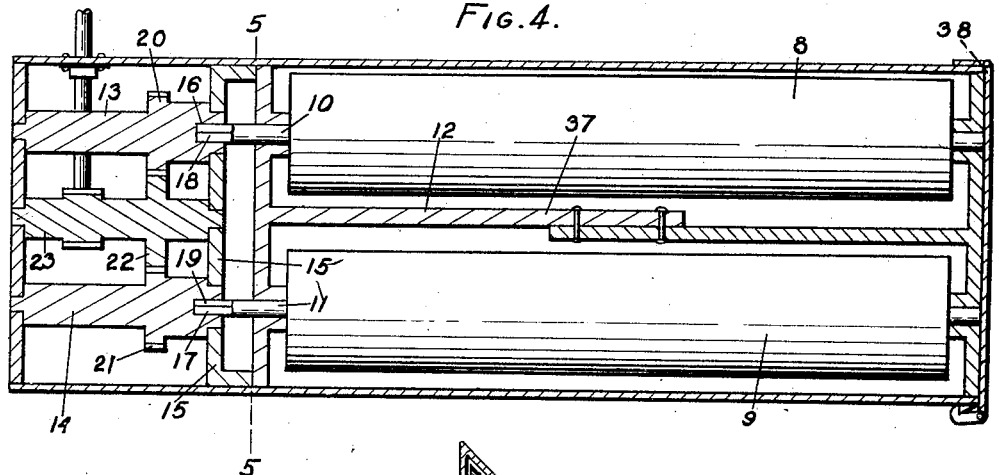
Figure 4 is a vertical longitudinal sectional view through the housing and parts carried thereby.
Figure 5:
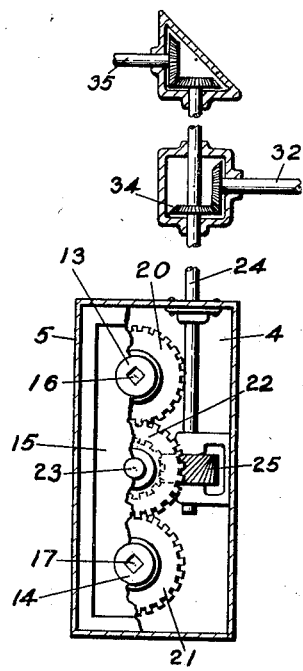
Figure 5 is a vertical sectional view through the housing as seen along line 5—5, Fig. 4, with parts broken out.
Figure 6:
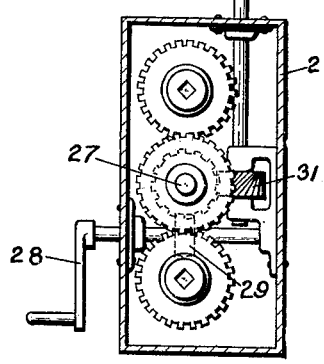
Figure 6 is a similar view through the master operating mechanism.

Referring to the drawings in which similar reference numerals designate corresponding parts throughout the several views, the numeral 1 designates a vehicle, in this instance a railway coach, which may be of any preferred construction, having a vestibule 2 therein and a space 3, for passengers.

In order to conveniently and positively advise the passengers of the name of the next street or station, an indicator mechanism 4 is mounted at the forward end of the compartment 3 and in position to be visible to all the passengers in said compartment, said mechanism comprising a housing 5, in the forward face of which is formed a window 6, through which characters will be visible to the passengers, such characters being mounted on a belt 7, or the like.

The ends of the belt 7 are attached to reels 8 and 9, one above and one below the other, the ends of the shafts 10 and 11, to which said reels are attached, being mounted in a frame 12, said frame having a sliding fit in the housing 5. At the opposite end of the housing 5 are positioned shafts 13 and 14, the outer ends thereof having bearings in the end wall of the housing while the inner ends find bearings in a partition wall 15, said latter ends having sockets 16 and 17, preferably square in cross section, for the reception of the squared ends 18 and 19, of the shafts 10 and 11, said shafts 10 and 11 being driven by the shafts 13 and 14.

The shafts 13 and 14 have gears 20 and 21 attached thereto, which mesh with an interposed gear 22 on a shaft 23, said latter shaft being midway between the shafts 13 and 14 and having bearings at its ends in the end wall of the housing and the partition 15. The shaft 23 is driven from a shaft 24 through the medium of a worm and gear mechanism 25 and as the gear 22 is in mesh with the gears 20 and 21, the shafts 13 and 14 will be driven thereby.

The indicator mechanism 4 is preferably operated from a master indicator mechanism 26, similar in construction to the indicator mechanism 4, except that driving power is imparted to the intermediate shaft 27, through the medium of a crank 28 and a worm and gear mechanism 29. A vertically extending shaft 30 is associated with the indicator mechanism 26 and power is applied thereto for rotating the same, from the shaft 27 by a worm and gear mechanism 31.

The upper end of the shaft 30 is connected with horizontally extending shaft 32 through the medium of bevel gears 33 and the opposite end of the shaft 32 is connected with the shaft 24 by means of bevel gears 34 and by connecting the master indicator mechanism 26 with the shaft 24 as shown, the belts in the respective indicator mechanisms will be moved in unison and by placing the master indicator 26 immediately in ready reach and vision of the operator of the vehicle, the operator can operate all the indicators connected with the master indicator without looking or giving any attention to any of the indicators, other than the master indicator. As indicated in Fig. 1, when a number of the cars or vehicles are connected together and drawn by the forward motor propelled vehicle, the indicators in the succeeding cars are operated from the master indicator through the medium of additional shaftings 35 through the various cars and connecting them together by means of flexible connections 36.

The frame 12 is preferably made in two companion T-shaped sections, the shanks 37 of which are secured together in any suitable manner to make the frame rigid so that the reels and their respective shafts may be readily assembled with the frame. After the frame 12 has been properly entered in the housing 5 and the ends of the shafts 10 and 11 have been entered in the sockets 16 and 17, the frame is locked in position by closing a door 38, which fits closely against the end of the frame and by securing the door in closed position, the frame and parts carried thereby will be held in operative position until the door is again opened. By constructing the belt carrier in this manner the carrying parts may be quickly removed and a belt for a different route substituted therefor.

In operating the device, after a street or station has been passed, the operator of the vehicle turns the crank 28 until the name of the next street or station moved into registration with the window in the master indicator 26, this operation at the same time moving the belt in the indicator to simultaneously and uniformly with the belt in the master indicator to display the proper street or station through the window 6 in the housing 5.

When the end of the route has been reached, the operator merely reverses the rotation of the crank 28 and reverses the travel of the belt containing the names of the streets. If the operator should make a mistake in any manner, it can be easily rectified by the proper manipulation of the crank 28.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. In an indicator for cars or the like, a housing, a partition in said housing dividing the interior thereof into compartments, a frame snugly fitting one of said compartments and entering said compartment at one end only, a closure means for said compartment adapted to lock said frame in said compartment, reels carried by said frame, a belt adapted to be wound on said reels, means in the other compartment of said housing for rotating said reels, and means for removably connecting said reels with said rotating means.

2. In an indicator for cars or the like, a housing, a partition dividing said housing into compartments, a frame having a snug sliding fit in one of said compartments and being entered from one end of the compartment, shafts carried by said frame, reels mounted on said shafts, a belt adapted to be wound onto said reels, shafts mounted in another compartment of said housing, gears for rotating said latter shafts, means for applying rotating power to said gears, and means for forming a sliding connection between the first and latter shafts.

3. In an indicator for cars or the like, a housing having a visual opening in one face thereof and an entrance opening at one end thereof, a door for closing the opening at the end of said housing and hingedly connected thereto, a frame adapted to be entered into said housing and be held therein by said door, reels carried by said frame, shafts carrying said reels, said shafts having squared portions at one end, driving shafts mounted in the opposite end of said housing having sockets shaped to receive the squared ends of said first shafts, intermeshing gears for rotating said driving shafts, and means for applying power to said shafts and gears.

4. In an indicator for cars or the like, a housing, a door for closing one end of said housing, a frame adapted to enter and be held within said housing by said door, said frame being formed from substantially T-shaped sections having overlapping shanks, means for connecting said overlapping shanks, reels carried by said frame, a belt adapted to be wound onto said reels, a driving means permanently mounted in one end of said housing, and means for removably connecting said reels with said driving means, whereby the frame and parts carried thereby may be interchanged without disturbing the housing and driving means therein.

In testimony whereof, I have hereunto set my hand on this the 27th day of December, 1929.

JAMES I. PARRISH.